(12) United States Patent
Runesson et al.

(10) Patent No.: US 8,522,540 B2
(45) Date of Patent: Sep. 3, 2013

(54) COUNTERBALANCING ARRANGEMENT

(75) Inventors: Johan Runesson, Linköping (SE);
Johannes Samuelsson, Tranås (SE);
Björn Limber, Linköping (SE)

(73) Assignee: Stromsholmen AB, Tranas (SE)

( * ) Notice: Subject to any disclaimer, the term of this patent is extended or adjusted under 35 U.S.C. 154(b) by 779 days.

(21) Appl. No.: 12/708,878

(22) Filed: Feb. 19, 2010

(65) Prior Publication Data
US 2010/0212305 A1 Aug. 26, 2010

Related U.S. Application Data

(60) Provisional application No. 61/156,604, filed on Mar. 2, 2009.

(30) Foreign Application Priority Data

Feb. 26, 2009 (SE) ........................................ 0950104

(51) Int. Cl.
*F16F 9/02* (2006.01)
(52) U.S. Cl.
USPC ............... 60/408; 60/409; 60/412; 267/64.28
(58) Field of Classification Search
USPC ................... 60/407, 408, 409, 411, 412, 413; 414/673, 719; 91/361, 390, 433; 294/81.3, 294/67.21; 267/64.17, 64.25, 64.28, 118, 267/124, 130
See application file for complete search history.

(56) References Cited

U.S. PATENT DOCUMENTS

| 4,635,908 | A | * | 1/1987 | Ludwig ..................... 267/64.11 |
| 4,904,150 | A | | 2/1990 | Swenson |
| 5,456,130 | A | * | 10/1995 | Pierson et al. .................. 74/469 |
| 5,560,733 | A | * | 10/1996 | Dickinson ......................... 404/6 |
| 6,247,306 | B1 | | 6/2001 | Sonnak |

(Continued)

FOREIGN PATENT DOCUMENTS

| DE | 208580 | 2/1907 |
| EP | 0379864 | 1/1990 |

(Continued)

OTHER PUBLICATIONS

Trainor (WO 2006/051247).*

(Continued)

*Primary Examiner* — Thomas E Lazo
(74) *Attorney, Agent, or Firm* — Fay Sharpe LLP

(57) ABSTRACT

A counterbalancing arrangement and a method for counterbalancing two mutually movable parts, which is arranged to counteract the gravitational force of at least one of the movable parts. The counterbalancing arrangement includes a gas spring and a compressor system. The compressor system is designed to sense a pressure in the gas spring and to adjust the pressure if the pressure deviates from a predetermined value. The counterbalancing arrangement can be used for counterbalancing an industrial robot arm and is capable of maintaining its working capacity regardless of any gas leakage and variations in the ambient temperature so as to result in very few unwanted stops occasioned by a need for servicing the balancing spring of the counterbalancing arrangement.

28 Claims, 8 Drawing Sheets

(56) References Cited

U.S. PATENT DOCUMENTS

| | | |
|---|---|---|
| 6,408,225 B1 | 6/2002 | Ortmeier et al. |
| 6,698,729 B2 * | 3/2004 | Popjoy .................. 267/64.28 |
| 6,962,220 B2 | 11/2005 | Takenaka et al. |
| 7,328,575 B2 * | 2/2008 | Hedman ...................... 60/407 |
| 2006/0153692 A1 * | 7/2006 | Calamai ......................... 417/63 |
| 2007/0151454 A1 * | 7/2007 | Marwitz et al. .................... 96/7 |
| 2007/0171036 A1 | 7/2007 | Nordmeyer |

FOREIGN PATENT DOCUMENTS

| | | |
|---|---|---|
| EP | 1905551 | 2/2008 |
| JP | 10044084 | 2/1998 |
| SE | 516448 | 1/2002 |

OTHER PUBLICATIONS

EP Search Report, EP10746515, Completed Aug. 1, 2012, Dated Aug. 24, 2012, Munich, DE.

* cited by examiner

COUNTERBALANCING ARRANGEMENT

The present invention claims priority on U.S. Provisional Application Ser. No. 61/156,604 filed Mar. 2, 2009 and Swedish Patent Application Serial No. 0950104-0 filed Feb. 26, 2009, both of which are fully incorporated herein by reference.

TECHNICAL FIELD

The present invention relates to a counterbalancing arrangement and a method for counterbalancing two mutually movable parts. The counterbalancing arrangement includes a gas spring and a compressor system, wherein the compressor system senses a pressure in the gas spring and adjusts the pressure if it deviates from a predetermined value.

BACKGROUND OF THE INVENTION

The use of balancing springs to counterbalance weights in various applications, for example in hydraulic and mechanical systems, has meant that components can be made smaller and less expensive and that they, in some cases, can be eliminated altogether.

A common field of application for balancing springs is in the counterbalancing of industrial robot arms, wherein the spring counteracts the gravitational forces of mutually movable robot parts. By virtue of the fact that the balancing spring compensates the dead weight of the robot arm, the latter can be optimized to enable lifting of large and heavy loads at maximum reach and the drive components for the robot can be of a smaller and more compact design.

Various types of balancing springs are used for counterbalancing industrial robots, for example springs of the hydraulic cylinder type, mechanical springs and gas springs.

The use of balancing springs, which are based on gas spring technology, offers a number of advantages as compared with mechanical springs and springs of the hydraulic cylinder type. A balancing gas spring has a higher efficiency, among other things, than a comparable hydraulic spring. A gas spring is capable of producing a greater force with minimal built-in dimensions than a mechanical spring. Furthermore, the balancing pressure of the gas spring can be regulated in a simple manner by adjusting the gas filling pressure in the gas spring.

Gas leakage will occur in all gas springs over time, even if they are sealed. Such gas leakage leads to a reduction of the gas pressure in the spring. In many industrial applications, such as press tools for steel molding, which is the most common field of application for the gas spring, gas leakage is not a problem since the gas springs are serviced more or less regularly and repaired when needed.

Gas springs are also sensitive to variations in the ambient temperature. When the temperature changes, so does the gas pressure inside the spring. The pressure in the spring increases with higher temperatures, and the pressure in the spring decreases with lower temperatures.

Because of the drawbacks stated above, gas springs have not been considered ideal for use as counterbalancing springs in industrial robots. There is an expressed need for a maintenance-free gas spring, which maintains a correct gas pressure in the spring at any given moment regardless of the ambient temperature, so that unwanted stoppage of the robot, and thus of production, occasioned by a need for servicing the spring can be avoided.

EP 1905551 discloses a balancing unit for an industrial robot, in which the balancing spring is a mechanical spring. The spring is supplied with pressurized air to prevent moisture and dirt from penetrating into the spring unit. However, the operation of this mechanical spring, just like the operation of a gas spring, is impeded by temperature variations and at high temperatures the operation has to be interrupted to allow for cooling, which results in unwanted production stops.

U.S. Pat. No. 6,408,225 discloses an arrangement for balancing the weight of a robot arm comprising a gas spring. The pressure in the spring is measured and used to control the movements of the robot and to automatically disconnect the robot drive in case the pressure exceeds/falls below a predetermined pressure limit as a result of temperature variations or gas leakage, so as to avoid damage to the robot. The robot then has to be serviced in order to restore the gas pressure in the spring before it can be put back into operation. With this system, the unit has to be stopped to restore the pressure in the spring, which affects production in a negative way.

There is thus a need for an improved balancing spring, whose function is unaffected by temperature variations in the operating environment and which is maintenance-free, so that the number of unwanted production stoppages can be reduced to a minimum.

SUMMARY OF THE INVENTION

The present document discloses a counterbalancing arrangement, which is sturdy and which is capable of maintaining its working capacity regardless of variations in the ambient temperature, as well as a method for counterbalancing, whereby fewer unwanted stops due to servicing of the balancing spring of the counterbalancing arrangement are required as compared with prior art gas springs.

More specific objects of the invention include providing a counterbalancing arrangement and a method for counterbalancing using a maintenance-free balancing spring of the gas spring type, wherein the pressure in the gas spring can be maintained at any given moment, regardless of any gas leakage from the spring and variations in the ambient temperature, without the need to interrupt production for the purpose of servicing the gas spring.

Embodiments of the invention are illustrated in the following description and the accompanying drawings.

According to a first aspect of the invention, a counterbalancing arrangement for counterbalancing two mutually movable parts is provided, which counterbalancing arrangement is arranged to counteract the gravitational force of at least one of the movable parts, the counterbalancing arrangement comprising a gas spring, which acts between the two movable parts, and a compressor system, which is arranged to sense a pressure in the gas spring and to adjust the pressure if it deviates from a predetermined value. By "two mutually movable parts" is meant, for example, two parts of an industrial robot. This counterbalancing arrangement provides for automatic pressure compensation of the gas spring by means of the compressor system when pressure changes occur in the spring due to gas leakage or as a result of changes in the ambient temperature. The pressure compensation is not intended to produce a movement of the unit, but to ensure the correct pressure in the gas spring at every given moment. This pressure compensation can occur during operation of the unit that is being counterbalanced by the counterbalancing arrangement, which results in an almost maintenance-free balancing spring and minimizes the number of unwanted production stops for servicing of the spring of the counterbalancing arrangement.

According to another aspect of the invention, the compressor system of the counterbalancing arrangement can comprise a compressor and an automatic control system, which comprises a pressure sensor and a pressure control valve, the automatic control system being adapted to control the compressor and/or the pressure control valve based on a signal from the pressure sensor.

According to another aspect of the invention, the automatic control system of the counterbalancing arrangement can store operating data from the compressor system and generate a service indication based on the operating data. A service indication can be given, for instance, after a predetermined number of pressure compensations have been performed by the compressor system. Alternatively, a service indication can be given after a certain operating time has passed, or after the measuring of any other appropriate parameter.

According to another aspect of the invention, the pressure sensor can measure the gas pressure in the balancing gas spring and, if the pressure falls below a preset limit value, a signal can be given to the automatic control system to start the compressor for the purpose of increasing the pressure in the spring. When the desired pressure has been reached, the compressor can be switched off. If, on the other hand, the gas sensor measures a pressure that exceeds a preset limit value, the pressure control valve can be opened for the purpose of reducing the pressure in the gas spring.

According to another aspect of the invention, the compressor system can be integrated with the gas spring, which means that it may be fixedly arranged on the gas spring and possibly enclosed in the housing of the same. In this way, a compact compressor system can be obtained.

According to another aspect of the invention, different types of compressors are conceivable for use in the compressor system of the present counterbalancing arrangement. The compressor can be electrically driven, pneumatically driven or driven by a pneumatic cylinder. The compressor can also be driven by the relative movement of the balancing spring.

According to another aspect of the invention, movable parts can be connected, for example, two respective mutually movable compressor parts are adapted to produce a pressure increase in a compression cavity of the compressor as they move relative to each other.

According to another aspect of the invention, the fluid with which the balancing gas spring is filled and which is supplied to the spring from the compressor system to ensure a correct pressure in the same can be a substantially inert gas, such as air and/or nitrogen gas.

According to another aspect of the invention, a membrane and/or a filter can be arranged in front of the inlet to the compressor to prevent moisture and dirt from penetrating into the compressor system and the gas spring.

According to another aspect of the invention, an external pressure source for supplying gas to the gas spring can be connected to an inlet of the compressor. The external pressure source can consist of an existing gas pipe system installed on the premises where the counterbalancing arrangement is used, which gas pipe system can be coupled to an inlet of the compressor. The external pressure source for supplying gas to the gas spring can consist of a gas tank connected to the counterbalancing arrangement. The gas tank can be mounted on the counterbalancing arrangement. Alternatively, the gas tank can be located adjacent to the counterbalancing arrangement. The gas tank should be filled with gas to a predetermined pressure level, which is lower than the pressure in the gas spring.

According to another aspect of the invention, if an excess pressure occurs in the balancing gas spring, gas can be returned to the gas tank, provided that the pressure is lower in the gas tank than in the spring.

According to another aspect of the invention, in the place of an external nitrogen gas source, a membrane can be arranged before an inlet to the compressor for separating nitrogen gas from air, so that only nitrogen gas is let into the compressor.

According to another aspect of the invention, a method for counterbalancing two mutually movable parts for counteracting the gravitational force of at least one of the movable parts is provided, which counterbalancing is performed by a counterbalancing arrangement comprising a gas spring acting between the movable parts, which method comprises sensing a pressure in the gas spring and adjusting the pressure if it deviates from a predetermined value. By virtue of the fact that the method for counterbalancing comprises sensing and compensating for variations in the gas pressure of the gas spring which occur as a result of gas leakage and variations in the ambient temperature, a correct pressure in the gas spring can be ensured at any given moment. This pressure compensation can occur during operation, which results in a reduced need for servicing the balancing spring and minimizes the number of unwanted production stops.

According to another aspect of the invention, the method includes controlling a compressor that is included in the compressor system based on a signal from a pressure sensor that is included in an automatic control system.

According to another aspect of the invention, the method includes driving the compressor by means of a relative movement between said two parts.

According to another aspect of the invention, the method includes storing operating data generated by the compressor system in the automatic control system and generating a service indication based on the operating data.

According to another aspect of the invention, the method includes supplying gas to the compressor via an external pressure source coupled to an inlet of the compressor. The external pressure source can include a gas tank connected to the counterbalancing arrangement.

According to another aspect of the invention, the method includes returning gas to the gas tank in case an excess pressure occurs in the gas spring.

According to another aspect of the invention, the method includes separating nitrogen gas from air by means of a membrane arranged before an inlet to the compressor so that only nitrogen gas is let into the compressor.

With this counterbalancing method the aforementioned advantages and alternative embodiments associated with the counterbalancing arrangement are obtained. These and other aspects of the invention will become apparent to those skilled in the art upon reading and understanding the following detailed description of preferred embodiments taken together with the drawings.

BRIEF DESCRIPTION OF THE DRAWINGS

Reference may now be made to the drawings, which illustrate several non-limiting embodiments that the invention may take in physical form and in certain parts and arrangements of parts wherein.

DETAILED DESCRIPTION OF THE DRAWINGS

Figure 1:
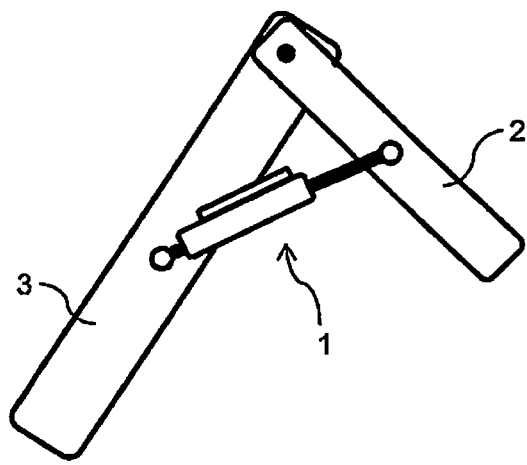
FIG. 1 is a schematic view of the counterbalancing arrangement which counterbalances two mutually movable parts.

Referring now to the drawings wherein the showings are for the purpose of illustrating non-limiting embodiments of the invention only and not for the purpose of limiting same, FIG. 1 shows a counterbalancing arrangement 1, which counterbalances two mutually movable parts 2, 3.

Figure 2:
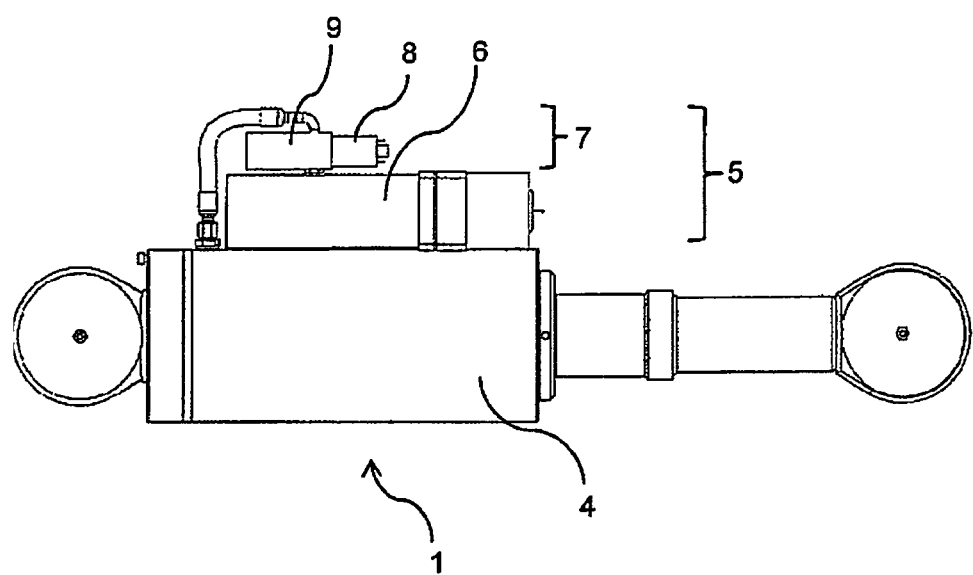
FIG. 2 is a schematic view of the counterbalancing arrangement with a compressor system and a balancing spring.
Figure 3:
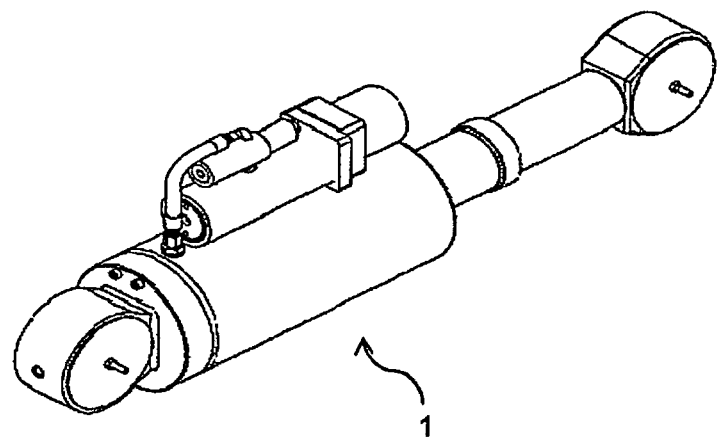
FIG. 3 is a schematic three-dimensional view of the counterbalancing arrangement.

FIG. 2 and FIG. 3 illustrate a counterbalancing arrangement 1 which comprises a balancing gas spring 4 and a compressor system 5. The compressor system can consist of a compressor 6 and an automatic control system 7. The automatic control system 7 can comprise a pressure sensor 8 and a pressure control valve 9. Based on a signal from the pressure sensor 8, the compressor 6 and/or the pressure control valve 9 can be controlled, which enables the pressure in the gas spring 4 to be regulated.

Figure 4:
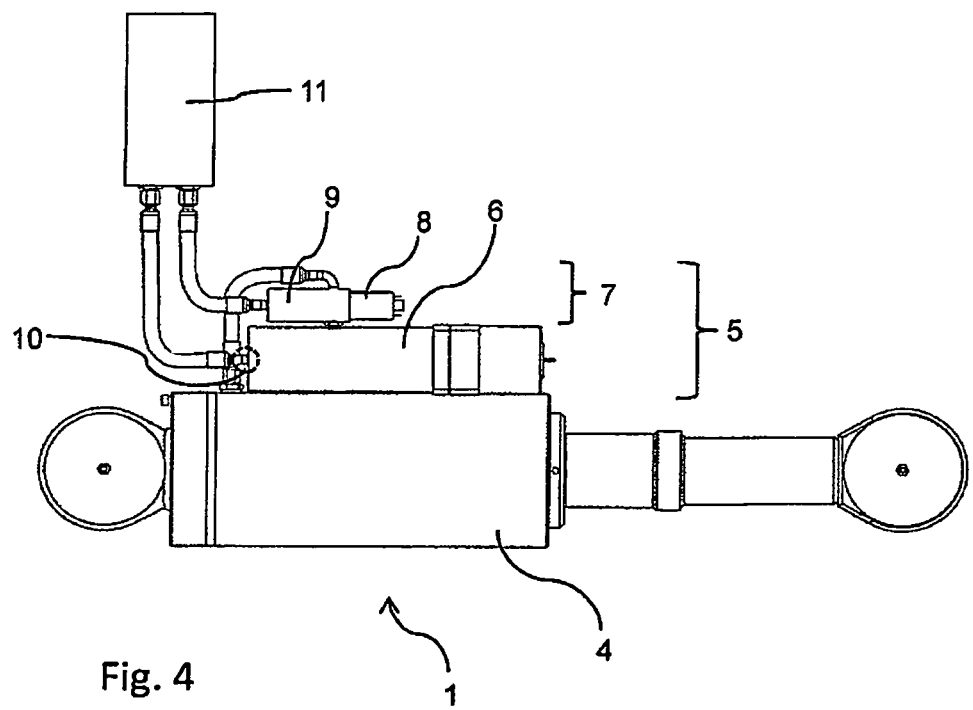
FIG. 4 is a schematic view of the counterbalancing arrangement with a system for gas compression.

The automatic control system 7 can be designed to maintain the gas pressure in the balancing spring 4 within preset limit values. The pressure sensor 8 measures the gas pressure in the gas spring 4 and, if the pressure falls below a preset limit value, the automatic control system 7 gives a signal to the compressor 6 to start so that the gas pressure in the spring 4 can be increased. When the desired pressure has been reached, the compressor 6 is switched off. If, on the other hand, the pressure sensor 8 measures a pressure that exceeds a preset limit value, the pressure control valve 9 is opened for the purpose of reducing the pressure in the gas spring 4. The fluid used to maintain the pressure in the counterbalancing arrangement 1 can be an inert gas, such as air and/or nitrogen gas. Fluid can be supplied to the arrangement from any kind of external pressure source. Any existing pipe system installed on the premises and adapted, for example, for the use of nitrogen gas, can be coupled directly to the inlet 10 of the compressor as illustrated in FIG. 4. Another alternative arrangement is the use of an external pressure source in the form of a gas tank 11. The gas tank 11 can be filled with gas to a predetermined pressure level and can be coupled to the inlet 10 of the compressor. In case an excess pressure occurs in the balancing system and the pressure control valve 9 is tripped, it is possible for the gas to be returned to the gas tank 11 via a pipe coupled to an outlet of the pressure control valve 9. Such an arrangement requires the pressure in the balancing system to be higher than the pressure in the gas tank 11. The external pressure source can be mounted adjacent to or directly on the counterbalancing arrangement 1.

In an alternative embodiment, a membrane (not shown), which filters out nitrogen gas from the air at the inlet 10 of the compressor, is used in place of an external pressure source. In this way, only nitrogen gas is let into the compressor 6, which compresses the nitrogen gas.

Figure 5:
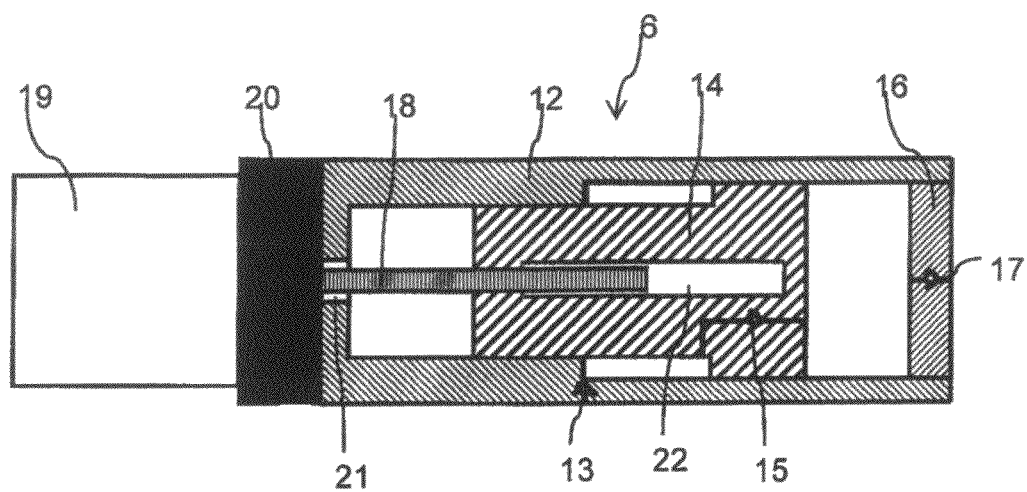
FIG. 5 is a schematic view of a compressor with electric drive.

Different types of compressors 6 can be used in the counterbalancing arrangement 1. In a first embodiment, an electrically driven compressor 6 is illustrated in FIG. 5. The electric compressor includes the following main components:
  a cylinder tube 12 with two diameters and a check valve 13;
  a piston 14 with two sealed diameters and a built-in check valve 15;
  a bottom part 16 with a check valve 17;
  a threaded rod 18; and,
  an electric motor 19 with a gearbox 20.

Piston 14 of the electric compressor is actuated by electric motor 19. An output shaft 21 from the gearbox 20 of the electric motor is coupled to the threaded rod 18, which in turn is connected to the piston 14 via a threaded hole 22. The rotary movement of the electric motor 19 is transmitted via threaded rod 18 to piston 14, which moves along a linear path in cylinder tube 12.

Figure 6:
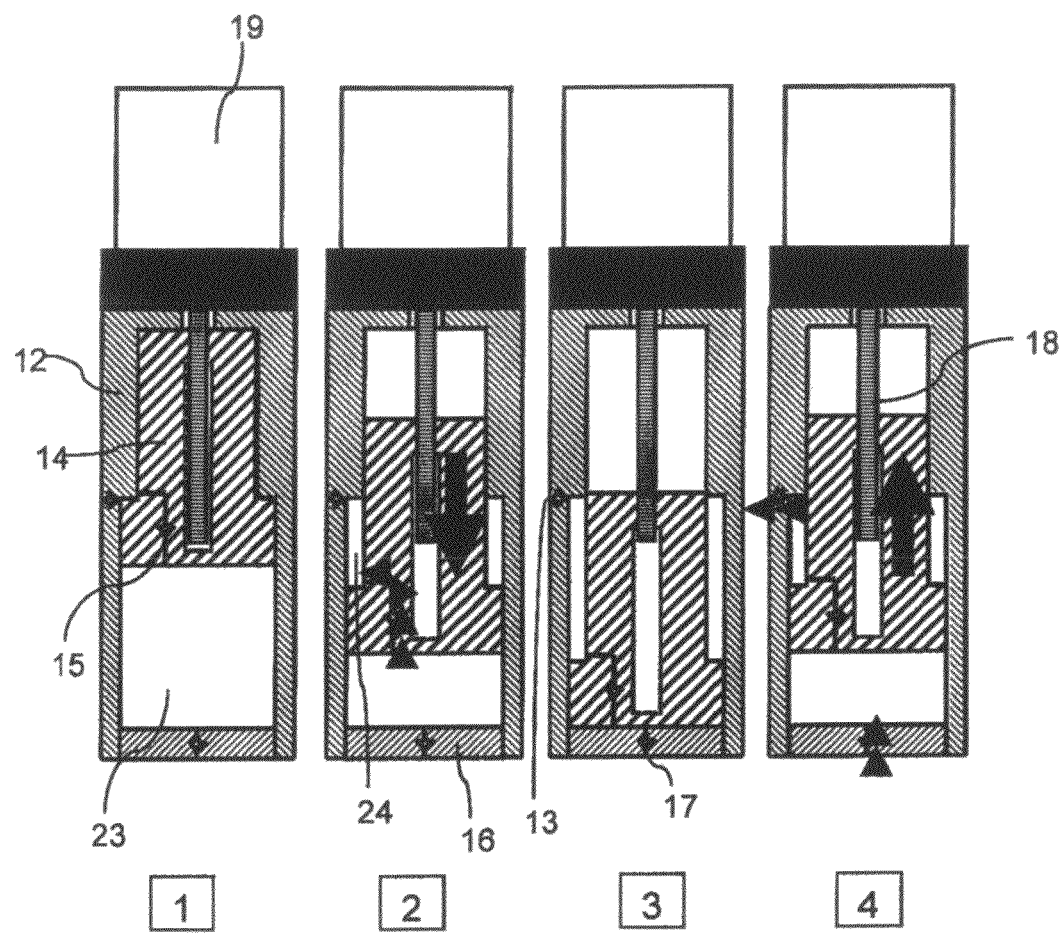
FIG. 6 illustrates, in four steps, the basic function of the electrically driven compressor in FIG. 5.

The basic function of the electrically driven compressor is illustrated in four steps as illustrated in FIG. 6:
  Step 1 The starting position of the compressor.
  Step 2 The piston 14 starts to move along a linear path in the cylinder tube 12. The fluid inside the first chamber 23 of the cylinder tube 12 flows via the built-in check valve 15 in the piston 14 to a second chamber 24 in the cylinder tube 12.
  Step 3 The piston 14 continues its movement until it comes into contact with the bottom part 16 and all the fluid has been transferred from the first chamber 23 to the second chamber 24.
  Step 4 The electric motor 19 then reverses its rotation and the threaded rod 18 changes direction of rotation. As a result, the piston 14 commences a linear movement in a direction opposite to the one in Step 2. The fluid in the second chamber 24 is thereby compressed and transferred from the second chamber 24 via an outlet, the check valve 13 of the cylinder tube, to the chamber of the balancing spring 4 or to a gas tank 11. At the same time, new fluid is sucked into the first chamber 23 via the check valve 17 in the bottom part 16. When the piston 14 is in the upper position, the electric motor 19 again changes direction of rotation and the compressor is ready to begin a new cycle. This procedure is repeated until the automatic control system 7 cuts off the current to the electric motor 19 when the right pressure has been reached inside the balancing spring 4.

To maximize fluid compression efficiency, the piston 14 should have reached the end position before the electric motor 19 changes direction, enabling the piston 14 to continue its movement in the opposite direction. There are different ways of solving this problem. The easiest way being to have the current control the reversal of rotation of the electric motor 19. When the piston 14 reaches the end position, the electric motor 19 starts to work harder, and the current across the motor increases. When the current exceeds a predetermined value, a signal is sent to the electric motor 19 to change the direction of rotation and the piston 14 moves in the opposite direction.

An alternative can be to use a limit switch to achieve the change of direction of the electric motor 19. A further alternative is to use a timing cycle as a means for changing the direction of rotation of the motor 19.

Figure 7:
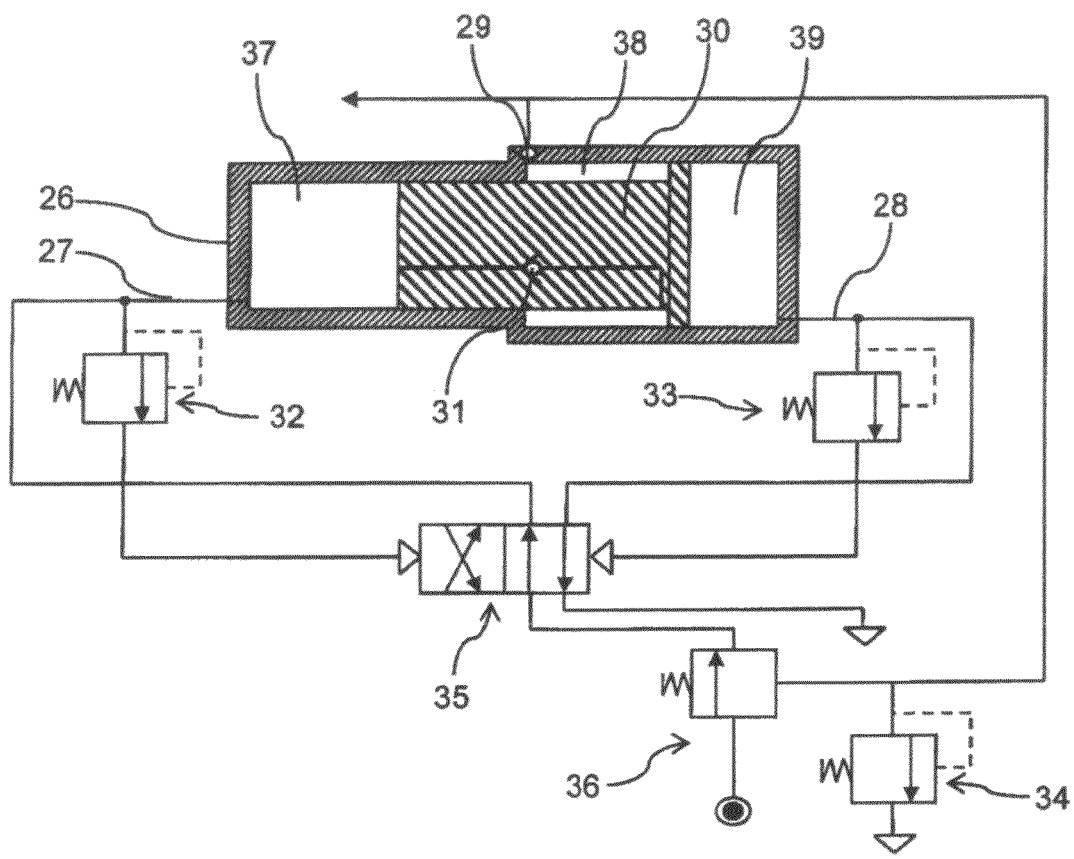
FIG. 7 is a schematic view of a compressor with pneumatic direct drive.

In a further embodiment, a compressor with pneumatic direct drive is used in the counterbalancing arrangement 1. A compressor of this kind includes the following main components as illustrated in FIG. 7:
  a cylinder tube 26 with two different diameters including two hoses 27, 28 and a check valve 29;
  a piston 30 with two different diameters and a built-in check valve 31;

an upper pressure control valve 32;
a lower pressure control valve 33;
a high-pressure valve 34;
a regulating valve 35; and,
a pressure switch 36.

Figure 8:
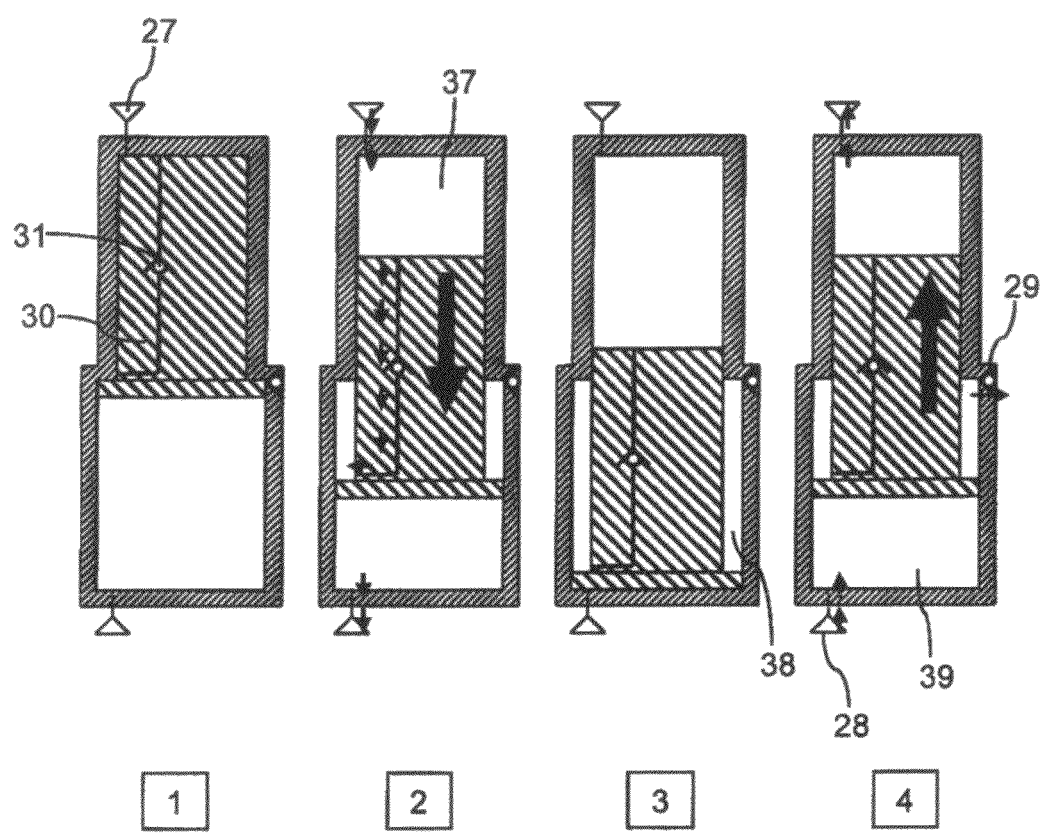
FIG. 8 illustrates, in four steps, the basic function of the compressor with pneumatic direct drive shown in FIG. 7.

A compressor 6 with pneumatic direct drive is very similar to a compressor with electric drive. When the pressure in the system falls below the lower predetermined pressure level, the pressure switch 36 allows fluid to flow through the regulating valve 35 and into the cylinder tube 26 through its upper hose 27 as illustrated in Step 1 in FIG. 8. The piston 30 then commences its downward movement while at the same time the fluid flows via the check valve 31 of the piston from the first 37 of the three chambers of the cylinder tube to the second chamber 38, which consists of the space between the piston 30 and the cylinder tube 26. When the piston 30 reaches one of its end positions, the pressure in the first chamber 37 increases and the upper pressure control valve 32 is activated to allow fluid to flow to the regulating valve 35, which is thus given the signal to change direction. At this point, the filling of fluid into the third chamber 39 can begin. When the regulating valve 35 receives the signal to change direction, the fluid flows through the lower hose 28 of the cylinder tube to the third chamber 39 and the piston 30 starts to move in the opposite direction. Compression of the fluid in the second chamber 38 now begins and the pressure increases, which causes the fluid to start flowing from the second chamber 38 of the cylinder tube via its check valve 29 to the chamber (not shown) of the balancing spring 4. When the piston 30 reaches its other end position, the pressure in the third chamber 39 increases and the lower pressure control valve 33 is activated to allow fluid to flow to the regulating valve 35, which is thus given the signal to change direction, and the compressor 6 is ready to begin a new cycle. This procedure is repeated until the pressure switch 36 shuts off the fluid flow when the right pressure has been reached inside the balancing spring 4. If the pressure inside the balancing spring 4 is excessively high, the high-pressure valve 34 is activated to evacuate gas until the right pressure is reached. In the place of a pneumatically controlled regulating valve 35, an electrically controlled regulating valve 35 can be used. The electrically controlled regulating valve 35 can be set to switch position for example by means of a timing cycle.

Figure 9:
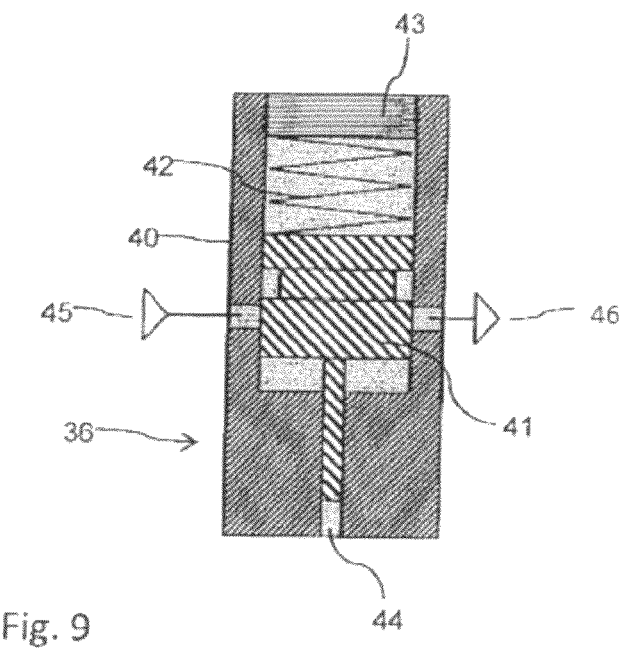
FIG. 9 is a schematic view of a pneumatic pressure switch.

Because pressure switches 36 designed for this purpose are quite uncommon, a switch of this kind can be designed according to FIG. 9. The pressure switch includes the following main components:
a valve housing 40;
a slide 41;
a spring 42;
an adjustable spring screw 43;
a connection to the balancing spring 44;
a fluid inlet 45; and,
a fluid outlet 46.

When the pressure inside balancing spring 4 falls below the predetermined level, the spring force of switch 36 will be predominant and slide 41 will move downwards. This allows fluid to flow through inlet 45 to outlet 46. When the pressure inside balancing spring 44 has increased to a sufficient level, slide 41 moves upwards to interrupt the fluid flow.

Figure 10:
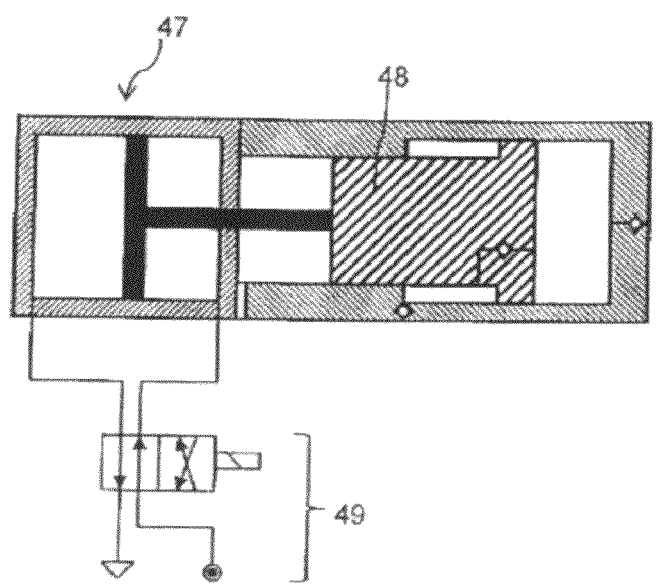
FIG. 10 is a schematic view of a compressor driven by a pneumatic cylinder; and, FIG. 11 is a schematic view of a compressor driven by the relative movement of the balancing spring.

In a third alternative embodiment a compressor 6 driven by a pneumatic cylinder 47 is illustrated in FIG. 10. The basic principle according to which air is compressed is the same as for the compressor with an electrical drive as illustrated in FIGS. 5 and 6. The difference is that a pneumatic cylinder 47 is used, in place of an electric motor 19 with a threaded bar 18, to produce a movement of the piston 48. To cause pneumatic cylinder 47 to change direction, a directional valve 49 is employed, which can be either electrically or pneumatically controlled. The pneumatically controlled variant is controlled according to the same principle as the compressor with pneumatic direct drive illustrated in FIGS. 7 and 8, and the electrically controlled variant may be set to change switch position for example by means of a timing cycle.

Figure 11:
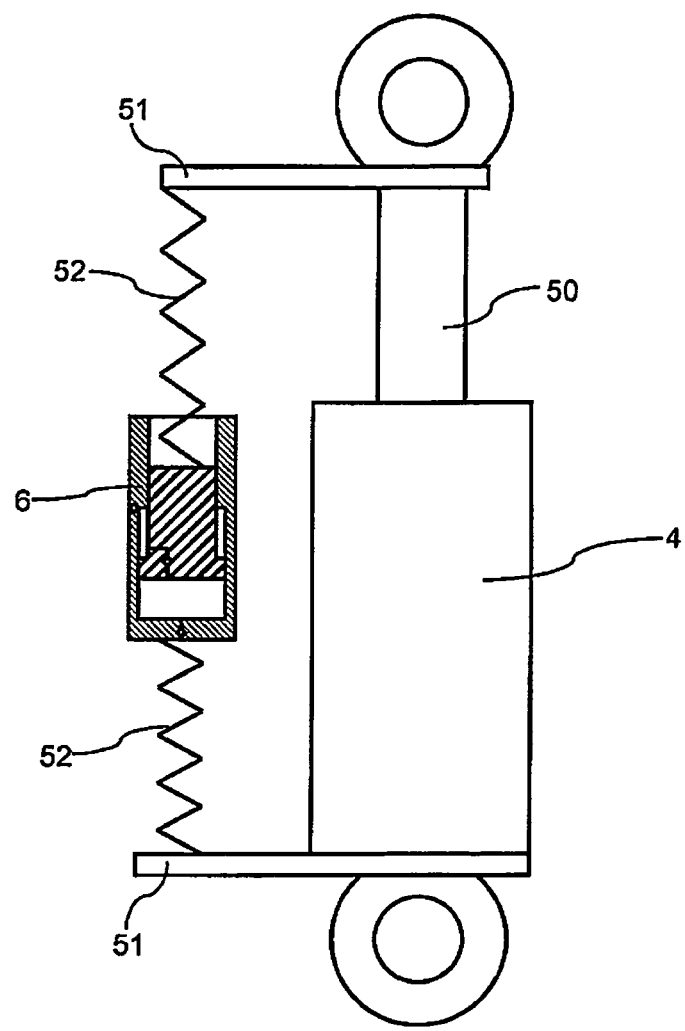

In a further embodiment, compressor 6 is driven by means of the relative movement of the balancing spring 4 as illustrated in FIG. 11. The basic principle of the compression cycle of the compressor 6 is the same as in previous embodiments. When balancing spring 4 is active, the piston rod 50 is often located in more or less the same position and performs only small reciprocating movements. These movements are transmitted via the spring mounts 51 and the springs 52 to the compressor 6, which is thus supplied with the power required to perform its compressions. In the event that the balancing gas spring 41, at certain stages, should perform larger movements, springs 52 will contract or expand to enable full strokes. Spring mounts 51 are vertically adjustable, which means that the operating position of compressor 6 can be adjusted according to the typical working range of piston rod 50 of balancing gas spring 4. Springs 52 may be coil springs, gas springs or other spring elements.

There are also times when balancing spring 4 operates at full stroke. In such cases, springs 52 in the above embodiment can be omitted and replaced by a fixed element.

The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

We claim:

1. A counterbalancing arrangement for counterbalancing two mutually movable parts that is arranged to counteract the gravitational force of at least one of said movable parts, said counterbalancing arrangement comprising a gas spring acting between said movable parts and a compressor system in fluid communication with said gas spring, said compressor system designed to sense a pressure in said gas spring and to adjust said pressure in said gas spring if said pressure deviates from a predetermined pressure value, said compressor system including a compressor and an automatic control system, said compressor and automatic control system designed to supply gas to said gas spring, remove gas from said gas spring, and combinations thereof so as to maintain said predetermined pressure value in said gas spring whenever said pressure in said gas spring deviates from said predetermined pressure value, said automatic control system including a pressure sensor and a pressure control valve, said pressure sensor designed to sense said pressure in said gas spring, said pressure control valve designed to regulate a flow of gas to said gas spring, from said gas spring, and combinations thereof, said automatic control system designed to control an operation of said compressor, said pressure control valve, and combinations thereof based on a signal from said pressure sensor, said compressor designed to be activated by said automatic control system and to cause fluid to be inserted into said gas spring when said pressure sensor senses a pressure in said gas spring that is below said predetermined pressure, said compressor including a housing, a linear moving piston that is movable in said housing, and a valve that controls a flow of a fluid in said housing between a first and second fluid chamber within said housing as said piston moves in said housing.

2. The counterbalancing arrangement as defined in claim 1, wherein said compressor system is integrated with said gas spring.

3. The counterbalancing arrangement as defined in claim 1, wherein said automatic control system is adapted to store operating data from said compressor system and to generate a service indication based on said operating data.

4. The counterbalancing arrangement as defined in claim 1, wherein said compressor is selected from the group consisting of an electrically driven compressor, a pneumatic direct drive compressor and a compressor driven by a pneumatic cylinder.

5. The counterbalancing arrangement as defined in claim 1, wherein said compressor is adapted to be driven by a movement between said two parts.

6. The counterbalancing arrangement as defined in claim 1, wherein said movable parts are connected to respective mutually movable compressor parts and are adapted to produce a pressure increase in a compression cavity as they move relative to each other.

7. The counterbalancing arrangement as defined in claim 1, wherein a fluid supplied to said gas spring is a substantially inert gas.

8. The counterbalancing arrangement as defined in claim 1, wherein an external pressure source for supplying gas is coupled to an inlet of said compressor.

9. The counterbalancing arrangement as defined in claim 8, wherein said external pressure source is a gas tank.

10. The counterbalancing arrangement as defined in claim 1, wherein a membrane is arranged before an inlet to said compressor, said membrane designed to separate nitrogen gas from air so that only nitrogen gas is let into said compressor.

11. The counterbalancing arrangement as defined in claim 1, wherein said first fluid chamber having a greater cross-sectional area than said second fluid chamber, said piston having a non-constant cross-sectional area.

12. The counterbalancing arrangement as defined in claim 1, wherein said compressor is designed to cause fluid to flow to said gas spring only when said piston moves in a first direction and to cause fluid to move between said first and second chambers when said piston moves in a second direction.

13. The counterbalancing arrangement as defined in claim 1, wherein said piston is caused to be moved by a threaded rod.

14. The counterbalancing arrangement as defined in claim 1, wherein said piston is caused to be moved by controlled fluid flow into an upper and lower portion of said compressor.

15. A counterbalancing arrangement for counterbalancing two mutually movable parts that is arranged to counteract the gravitational force of at least one of said movable parts, said counterbalancing arrangement comprising a gas spring acting between said movable parts and a compressor system in fluid communication with said gas spring, said compressor system designed to sense a pressure in said gas spring and to adjust said pressure in said gas spring if said pressure deviates from a predetermined pressure value, said compressor system including a compressor and an automatic control system, said compressor and automatic control system designed to supply gas to said gas spring, remove gas from said gas spring, and combinations thereof so as to maintain said predetermined pressure value in said gas spring whenever said pressure in said gas spring deviates from said predetermined pressure value, an external pressure source for supplying gas is coupled to an inlet of said compressor, said external pressure source is a gas tank, said gas tank is filled with gas to a predetermined pressure level, said predetermined pressure level is lower than a pressure level in said gas spring, said automatic control system including a pressure sensor and a pressure control valve, said pressure sensor designed to sense said pressure in said gas spring, said pressure control valve designed to regulate a flow of gas to said gas spring, from said gas spring, and combinations thereof, said automatic control system designed to control an operation of said compressor, said pressure control valve, and combinations thereof based on a signal from said pressure sensor.

16. A counterbalancing arrangement for counterbalancing two mutually movable parts that is arranged to counteract the gravitational force of at least one of said movable parts, said counterbalancing arrangement comprising a gas spring acting between said movable parts and a compressor system in fluid communication with said gas spring, said compressor system designed to sense a pressure in said gas spring and to adjust said pressure in said gas spring if said pressure deviates from a predetermined pressure value, said compressor system including a compressor and an automatic control system, said compressor and automatic control system designed to supply gas to said gas spring, remove gas from said gas spring, and combinations thereof so as to maintain said predetermined pressure value in said gas spring whenever said pressure in said gas spring deviates from said predetermined pressure value, an external pressure source for supplying gas is coupled to an inlet of said compressor, said external pressure source is a gas tank, a pipe for returning gas to said gas tank is connected to an outlet of said pressure control valve, said pipe is designed to return gas to said gas tank when excess pressure occurs in said gas spring, said automatic control system including a pressure sensor and a pressure control valve, said pressure sensor designed to sense said pressure in said gas sprig, said pressure control valve designed to regulate a flow of gas to said gas spring, from said gas spring, and combinations thereof, said automatic control system designed to control an operation of said compressor, said pressure control valve, and combinations thereof based on a signal from said pressure sensor.

17. A method for counterbalancing two mutually movable parts for counteracting the gravitational force of at least one of said movable parts, counteracting the gravitational force performed by a counterbalancing arrangement comprising a gas spring acting between said movable parts characterized by the steps of:

sensing, by means of a compressor system, a pressure in said gas spring and adjusting said pressure in said gas spring in response to gas leakage, temperature variations, and combinations thereof when a pressure in said gas spring deviates from a predetermined pressure value, said compressor designed to be activated and to cause fluid to be inserted into said gas spring when said pressure in said gas spring is below said predetermined pressure, said compressor including a housing, a linear moving piston that is movable in said housing, and a valve that controls a flow of a fluid in said housing between a first and second fluid chamber within said housing as said piston moves in said housing.

18. The method as defined in claim 17, including the step of controlling a compressor, a pressure control valve, and combinations thereof that is included in said compressor system based on a signal from a pressure sensor that is included in an automatic control system.

19. The method as defined in claim 17, including the step of driving said compressor by means of a relative movement between said two parts.

20. The method as defined in claim 17, including the step of storing operating data generated by said compressor system in said automatic control system and generating a service indication based on said operating data.

21. The method as defined in claim 17, including the step of supplying gas to said compressor via an external pressure source that is coupled to an inlet of said compressor.

22. The method as defined in claim 21, wherein said external pressure source includes a gas tank connected to said counterbalancing arrangement.

23. The method as defined in claim 17, including the step of separating nitrogen gas from air by means of a membrane arranged before an inlet to said compressor so that only nitrogen gas is let into said compressor.

24. The method as defined in claim 17, wherein said first fluid chamber having a greater cross-sectional area than said second fluid chamber, said piston having a non-constant cross-sectional area.

25. The method as defined in claim 17, wherein said compressor is designed to cause fluid to flow to said gas spring only when said piston moves in a first direction and to cause fluid to move between said first and second chambers when said piston moves in a second direction.

26. The method as defined in claim 17, wherein said piston is caused to be moved by a threaded rod.

27. The method as defined in claim 17, wherein said piston is caused to be moved by controlled fluid flow into an upper and lower portion of said compressor.

28. A method for counterbalancing two mutually movable parts for counteracting the gravitational force of at least one of said movable parts, counteracting the gravitational force performed by a counterbalancing arrangement comprising a gas spring acting between said movable parts characterized by the steps of:

sensing, by means of a compressor system, a pressure in said gas spring;

adjusting said pressure in said gas spring in response to gas leakage, temperature variations, or combinations thereof when a pressure in said gas spring deviates from a predetermined pressure value;

supplying gas to said compressor via an external pressure source that is coupled to an inlet of said compressor, said external pressure source includes a gas tank connected to said counterbalancing arrangement; and, returning gas to said gas tank in case an excess pressure occurs in said gas spring.

* * * * *